Figure 1:
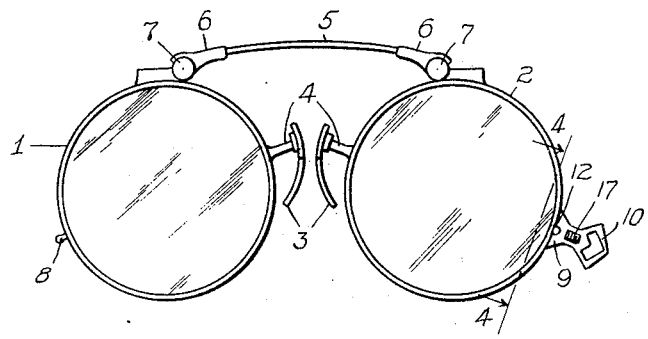

Nov. 14, 1933.   J. GASPARI   1,935,224
FRAME FOR EYEGLASSES OF THE PINCE-NEZ TYPE

Filed May 24, 1932

Joseph Gaspari
INVENTOR

BY
ATTORNEY.

Patented Nov. 14, 1933

1,935,224

UNITED STATES PATENT OFFICE 1,935,224

FRAME FOR EYEGLASSES OF THE PINCE-NEZ TYPE

Joseph Gaspari, New York, N. Y., assignor to J. Gaspari & Company, Inc., New York, N. Y., a corporation of New York Application May 24, 1932. Serial No. 613,239

3 Claims. (Cl. 88—44)

My invention relates to frames for eyeglasses of the pince-nez type, which includes oxfords, lorgnettes, glove lorgnettes and the like, and has especial reference to the catch mechanism through the medium of which the frame members designed to hold the lenses are retained in and released from closed position.

The usual commercial type of catch mechanism includes a partially open housing on one frame member containing a spring pressed pin and a lug on the other frame member designed to cooperate with the pin. The opening in the housing is so formed and located that in order to close the eyeglass, i. e., to place the lens-carrying frames in superimposed position, one frame must be slid over the other frame until the lug enters the housing and is engaged by the spring pressed pin. To open the eyeglass, the pin is withdrawn from engagement with the lug and the two frame members snap open, one lens or frame member again sliding on the other.

The construction outlined above has certain disadvantages, perhaps the most serious of which is the tendency of the lenses and more particularly toric lenses to become scratched as they slide over each other. As a general thing, the opening and closing action is frequently repeated by the average user, and it requires but a relatively short time for the glass of the lenses to become scratched to an extent either to interfere with vision or to render the eyeglass practically useless. Another disadvantage is the difficulty experienced by the average person in folding the glass without having the projecting nose pads strike and catch against each other; the frames are carried at opposite ends of the bridge which consists of a fairly powerful spring so that considerable force must be exerted in folding the eyeglass. The striking or catching of the nose pads against each other, particularly if repeated, generally results in the pads being bent thereby disturbing the proper adjustment of the glass as a whole, or in their being broken, in either event necessitating repair of some kind, which involves expense to the wearer. Owing to the small compass in which the spring, the pin under the control thereof and the pin retracting mechanism are contained, these parts must all be fine and small, necessitating careful and relatively expensive work in producing the same and involving the danger of these parts easily getting out of order and requiring frequent repair.

The principal object of my invention is to provide a construction of catch mechanism by means of which the disadvantages of existing constructions are obviated.

I accomplish this object by constructing the catch in such manner that no spring pressed pin is required to hold the glass folded, and that in order to fold the eyeglass the lenses are not slid over each other but are laid over each other, as it were; a projection on one frame member being moved downwardly into a suitable opening in the housing carried by the other frame member.

Briefly stated, the invention comprises a projection at or near the rim of one frame member designed to be moved into and out of a housing on the other frame member, the housing having what may be termed a top opening for the reception of the projection.

Figures 2, 3:
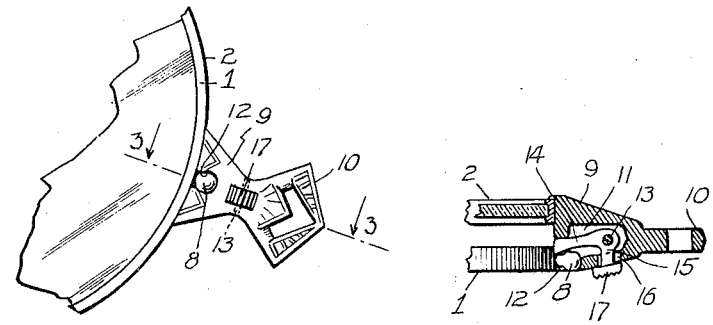
Figure 4:
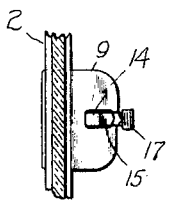

An illustrative form of the invention is shown in the accompanying drawing, in which Fig. 1 is an elevational view of the eyeglass frame in open position; Fig. 2 is an enlarged elevational view of a portion of the frame in closed position with the catch engaged; Fig. 3 is a longitudinal sectional view on the line 3—3 of Fig. 2 and Fig. 4 is a transverse sectional view on the line 4—4 of Fig. 1.

Referring to the drawing, 1 and 2 denote the usual lens frames carrying the nose pads 3 at the ends of posts 4 and interconnected by the spring bridge 5 the ends of which are held in sockets 6 pivoted at 7 to the frames 1 and 2. The parts just described constitute standard construction and do not form part of my invention.

Projecting from the outer periphery of one of the frame members, preferably the left frame member 1, at a point remote from the pivot 7, is a headed stud 8, the head of which may have any desired shape although by preference it is substantially globular as shown in the drawing. The stud 8 extends substantially in the plane of the frame 1.

Secured to the other frame, 2, in substantially the same relative position as that in which the headed stud 8 is carried by the frame member 1, is a housing denoted generally as 9, and terminating at its outer end in the eye portion 10 which is for the reception of a ribbon or chain.

The housing, which is preferably, although not necessarily substantially triangular in shape, has an internal cavity 11 communicating with an orifice 12 constituting a socket in such position that the head of the stud 8 may be moved down into the orifice and lodged therein.

Traversing the lateral walls of the housing 9 is a pintle or pivot pin 13 upon which is mounted a two armed lever, the longer arm 14 extending upwardly into the orifice 12 and the shorter arm 15 extending through a slot 16 in the front wall of the housing and terminating in an operating button 17. As will be apparent, particularly from Fig. 3, the arm 14 is somewhat enlarged at its upper end to form a camming member for the purpose of coacting with the headed stud 8. The arm 14 extends in the longitudinal axis of the housing 9 while the arm 15 extends in its transverse axis.

The device is manipulated substantially as follows:—Assuming the eyeglass is to be closed, that is moved from the position shown in Fig. 1 to that shown in Fig. 2, the left-hand frame member, 1, is raised somewhat above the plane of the frame member 2, then moved over onto the frame member 2 until the headed stud 8 is in line with the orifice 12 whereupon the head of the stud is inserted into the orifice. This action having taken place counter to the force of the spring 5, when the head of the stud is in the orifice 12 the parts will remain in this position (the position shown in Fig. 2) until the head is positively removed from the orifice. Such removal is effected by pressing against the operating button 17 thereby causing the arm 14 to press with its camming end against the head of the stud, forcing the latter out of the orifice and permitting the spring 5 to perform its normal function of snapping the frame 1 away from the frame 2 and restoring the parts to the position shown in Fig. 1.

It will be noted that in the course of this manipulation, both in the closing and in the opening movements of the eyeglass, all sliding of one lens on the other is avoided, and in consequence danger of scratching the lenses is also prevented. Moreover, inasmuch as in closing the eyeglass the left hand frame is raised, the nose pad on the other frame is cleared so that danger of the two nose pads catching or striking against each other is reduced to a minimum.

It will also be noted that no spring of any kind is used to operate the double armed lever, and the omission of a spring is made possible by the fact that the headed stud 8 is held in an orifice having walls at the two opposite sides of the stud as distinguished from the prior art construction in which one side of the socket is completely open, and unless a spring controlled pin to hold the stud were used the latter would spring out of the socket the moment the hand is released from the frame.

It may also be noted, upon reference to Fig. 3, that when the eyeglass is closed the two frames are held a fairly appreciable distance apart, thus adding to the safeguard against scratching of the lenses.

I claim:
1. In a latching mechanism for an eyeglass including frame members interconnected by a spring bridge, the combination of a projection on one of the frame members, with a housing on the other frame member, said housing projecting from said other frame member in the plane thereof and containing a cavity extending in the longitudinal axis of the housing connected with an unobstructed uncovered orifice extending substantially at right angles to the longitudinal axis of the housing and said orifice being adapted to receive said projection, and means supported within the housing for positively moving the projection out of the orifice.

2. In a latching mechanism for an eyeglass including frame members interconnected by a spring bridge, comprising the combination of a headed stud projecting from the periphery of one of the frames at a point remote from the bridge, a housing projecting from the periphery of the other frame in the plane thereof in a relative position corresponding to that at which the headed stud is located on the first frame, said housing having a cavity therein extending in the longitudinal axis of the housing communicating with a two walled orifice unobstructedly accessible from the top of said housing, said orifice extending substantially at right angles to the longitudinal axis of the housing, said headed stud being adapted to be inserted in said orifice, and a camming member pivotally mounted in said cavity and accessible from the exterior of the housing for the positive removal of the stud from the orifice.

3. In a latching mechanism for an eyeglass including frame members interconnected by a spring bridge, the combination of a housing secured to one of the frame members, said housing containing a cavity extending in the longitudinal axis of the housing communicating with an unobstructed orifice in the upper front wall of said housing, said orifice extending substantially at right angles to the longitudinal axis of the housing, a two armed lever pivoted in said housing, one arm of said lever having an enlarged end projecting into the cavity and the second arm of the lever projecting through a slot to the exterior of the housing and having an operating button at its projecting end, and a headed stud on the other frame member, said headed stud being adapted for manual insertion into and mechanical removal from said orifice.

JOSEPH GASPARI.